US011787428B2

(12) United States Patent
Pandy et al.

(10) Patent No.: US 11,787,428 B2
(45) Date of Patent: Oct. 17, 2023

(54) DIAGNOSTIC METHOD AND SYSTEM FOR AN AUTOMATED VEHICLE (71) Applicant: ZF Friedrichshafen AG, Friedrichshafen (DE)

(72) Inventors: Ananda Pandy, West Lafayette, IN (US); Daniel Williams, Carmel, IN (US); Shreyas Chaudhari, Lafayette, IN (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 223 days.

(21) Appl. No.: 17/192,222

(22) Filed: Mar. 4, 2021

(65) Prior Publication Data
US 2022/0281468 A1  Sep. 8, 2022

(51) Int. Cl.
*B60W 50/04* (2006.01)
*B60W 50/035* (2012.01)
*B60W 10/20* (2006.01)
*B60W 10/18* (2012.01)
*B60W 50/038* (2012.01)
B60W 50/00 (2006.01)

(52) U.S. Cl.
CPC .......... *B60W 50/045* (2013.01); *B60W 10/18* (2013.01); *B60W 10/20* (2013.01); *B60W 50/035* (2013.01); *B60W 50/038* (2013.01); B60W 2050/0075 (2013.01)

(58) Field of Classification Search
CPC .................................................. B60W 50/045
See application file for complete search history.

(56) References Cited

U.S. PATENT DOCUMENTS

| | | | | |
|---|---|---|---|---|
| 9,406,177 | B2* | 8/2016 | Attard | G07C 5/0808 |
| 10,922,906 | B2* | 2/2021 | Wang | G07C 5/0816 |
| 11,208,111 | B2* | 12/2021 | Chi | B60W 50/023 |
| 2022/0068053 | A1* | 3/2022 | Hinduja | B60H 1/00021 |
| 2022/0281468 | A1* | 9/2022 | Pandy | B60W 50/045 |

* cited by examiner

*Primary Examiner* — Michael A Berns
(74) *Attorney, Agent, or Firm* — Dority & Manning, P.A.

(57) ABSTRACT

A diagnostic method for an automated vehicle includes monitoring data from a first vehicle subsystem of a plurality of vehicle subsystems to establish a current operating zone for the first vehicle subsystem, transmitting a master diagnostic message with an anomalous status for the first vehicle subsystem in response to the current operating zone for the first vehicle subsystem being outside of an anomalous behavior boundary of a normal operating zone for the first vehicle subsystem for at least a predetermined period of time, the common master diagnostic message being transmitted to each vehicle subsystem of the plurality of vehicle subsystems, and adjusting operation of at least a second one of the plurality of vehicle subsystems in response to receiving the master diagnostic message with the anomalous status for the first vehicle subsystem. A related diagnostic system is also provided.

20 Claims, 6 Drawing Sheets

DIAGNOSTIC METHOD AND SYSTEM FOR AN AUTOMATED VEHICLE

FIELD OF THE INVENTION

The present subject matter relates generally to diagnostic systems and methods for automated vehicles.

BACKGROUND OF THE INVENTION

Conventional vehicles generally rely upon a human driver to assist with detecting system malfunctions and failures. Moreover, conventional vehicles frequently rely upon the human driver to safely operate vehicles experiencing system malfunctions or failures.

The field of automated vehicles continues to see substantial investment and development. Automated vehicles generally replace and/or supplement the human driver. Thus, in contrast to conventional vehicles, human drivers may be unavailable to detect or remediate system malfunctions and failures in automated vehicles.

Methods and systems for diagnosing malfunctions of subsystems in automated vehicles, such as highly automated vehicles, would be useful.

BRIEF DESCRIPTION OF THE INVENTION

Aspects and advantages of the invention will be set forth in part in the following description, or may be apparent from the description, or may be learned through practice of the invention.

The present subject matter relates generally to systems and methods for diagnostics of automated vehicle subsystems, such as highly automated vehicle subsystems. In certain example embodiments, the diagnostic systems and methods may detect and/or remediate vehicle subsystem anomalies in automated vehicles. Moreover, the diagnostic systems and methods may communicate the anomalous behavior of one vehicle subsystem to one or more additional vehicle subsystem(s), e.g., to ensure safe operation of the autonomous vehicle.

In an example embodiment, a diagnostic method for an automated vehicle includes monitoring data from a first vehicle subsystem of a plurality of vehicle subsystems to establish a current operating zone for the first vehicle subsystem, and transmitting a master diagnostic message with an anomalous status for the first vehicle subsystem in response to the current operating zone for the first vehicle subsystem being within an anomalous behavior boundary of a normal operating zone for the first vehicle subsystem for at least a predetermined period of time. The common master diagnostic message is transmitted to each vehicle subsystem of the plurality of vehicle subsystems. The diagnostic method according to the example embodiment also includes adjusting operation of at least a second one of the plurality of vehicle subsystems in response to the at least the second one of the plurality of vehicle subsystems receiving the master diagnostic message with the anomalous status for the first vehicle subsystem.

In a first example aspect, the diagnostic method further includes, when the current operating zone for the first vehicle subsystem is not within the anomalous behavior boundary of the normal operating zone for the first vehicle subsystem, recording an operating zone deviation incident each time that the current operating zone for the first vehicle subsystem is outside of the normal operating zone for the first vehicle subsystem for at least the predetermined period of time, and adjusting the normal operating zone for the first vehicle subsystem in response to a total number of recorded operating zone deviation incidents exceeding a threshold number of incidents. The normal operating zone for the first vehicle subsystem may be adjusted to account for wear of the first vehicle subsystem.

In a second example aspect, the diagnostic method further includes determining the normal operating zone for the first vehicle subsystem based on data from the first vehicle subsystem over a plurality of operating cycles.

In a third example aspect, the diagnostic method further includes replacing the determined normal operating zone for the first vehicle subsystem with a predefined theoretical normal operating zone based on design parameters for the first vehicle subsystem when the determined normal operating zone is different from the predefined theoretical normal operating zone by more than a threshold tolerance.

In a fourth example aspect, the plurality of vehicle subsystems includes two or more of a steering system, a braking system, and a powertrain system.

In a fifth example aspect, the first vehicle subsystem includes a steering system, and monitoring data from the first vehicle subsystem includes monitoring a signal from a torque and angle sensor of the steering system.

In a sixth example aspect, the first vehicle subsystem includes a steering system, and monitoring data from the first vehicle subsystem includes monitoring a signal from one or more of a flow sensor, a pressure sensor, and a temperature sensor of the steering system.

In a seventh example aspect, the diagnostic method further includes transmitting the master diagnostic message with the anomalous status for the first vehicle subsystem to a remote computing device. The remote computing device may be disposed within another vehicle, and the remote computing device receives the master diagnostic message with the anomalous status for the first vehicle subsystem over a vehicle-to-vehicle network. Alternatively, the remote computing device may be disposed within an infrastructure building, and the remote computing device receives the master diagnostic message with the anomalous status for the first vehicle subsystem over a vehicle-to-infrastructure network.

In an eighth example aspect, adjusting operation of at least the second one of the plurality of vehicle subsystems reduces a vehicle speed.

In a ninth example aspect, the diagnostic method further includes scheduling service of the first vehicle subsystem in response to receiving the master diagnostic message with the anomalous status for the first vehicle subsystem.

In a tenth example aspect, a control system of an autonomous vehicle may be configured and/or programmed to implement the diagnostic method. For instance, a diagnostic system for an automated vehicle may include one or more processing devices and one or more non-transitory, computer-readable memories storing instructions that when executed by the one or more processing devices cause the one or more processing devices to monitor data from a first vehicle subsystem of a plurality of vehicle subsystems to establish a current operating zone for the first vehicle subsystem, generate a master diagnostic message with an anomalous status for the first vehicle subsystem for transmission to each vehicle subsystem of the plurality of vehicle subsystems in response to the current operating zone for the first vehicle subsystem being within an anomalous behavior boundary of a normal operating zone for the first vehicle subsystem for at least a predetermined period of time, and order adjustment in operation of at least a second one of the plurality of vehicle subsystems in response to the master diagnostic message with the anomalous status for the first vehicle subsystem being received by the at least the second one of the plurality of vehicle subsystems.

Each of the example aspects recited above may be combined with one or more of the other example aspects recited above in certain embodiments. For instance, all of the ten example aspects recited above may be combined with one another in some embodiments. As another example, any combination of two, three, four, or five of the ten example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Example embodiments of the present disclosure are directed to diagnostic methods and systems for automated vehicles, such as highly automated vehicles. The example methods and systems may provide diagnostics utilizing existing vehicle sensors and/or data. The example methods and systems may also provide diagnostics utilizing additional sensors. For instance, anomalies and/or failures within a steering system may result in a hard steering effect or a soft steering effect, which is conventionally easy for a human driver to diagnose and safely respond. In example embodiments, the hard steering effect or the soft steering effect may be detected with a torque and angle sensor of steering system, e.g., by detecting the variation in torque usage and steering system response. Moreover, a flow sensor, a pressure sensor, and/or a temperature sensor of the steering system may increase the diagnostic capability.

Once anomalies and/or failures are detected, a common master diagnostic message may be generated. The common master diagnostic message may include status information for each subsystem of the autonomous vehicle, such as the steering system, a braking system, a powertrain system, etc. Using the common master diagnostic message, any critical failure of one or more subsystems of the autonomous vehicle may be communicated across the autonomous vehicle, e.g., to each subsystem of the autonomous vehicle. The common master diagnostic message may also be transmitted to law enforcement, vehicle inspectors, remote health monitoring services for automated vehicles, etc. to assist with troubleshooting the autonomous vehicle. The common master diagnostic message may be a series of escalating messages, each of which corresponds to a respective level of action. Thus, e.g., subsystem anomalies may be reported to an external customer controller and/or other vehicle subsystems using the common master diagnostic message, e.g., in order to safely bring the vehicle to a safe state.

Figure 1:
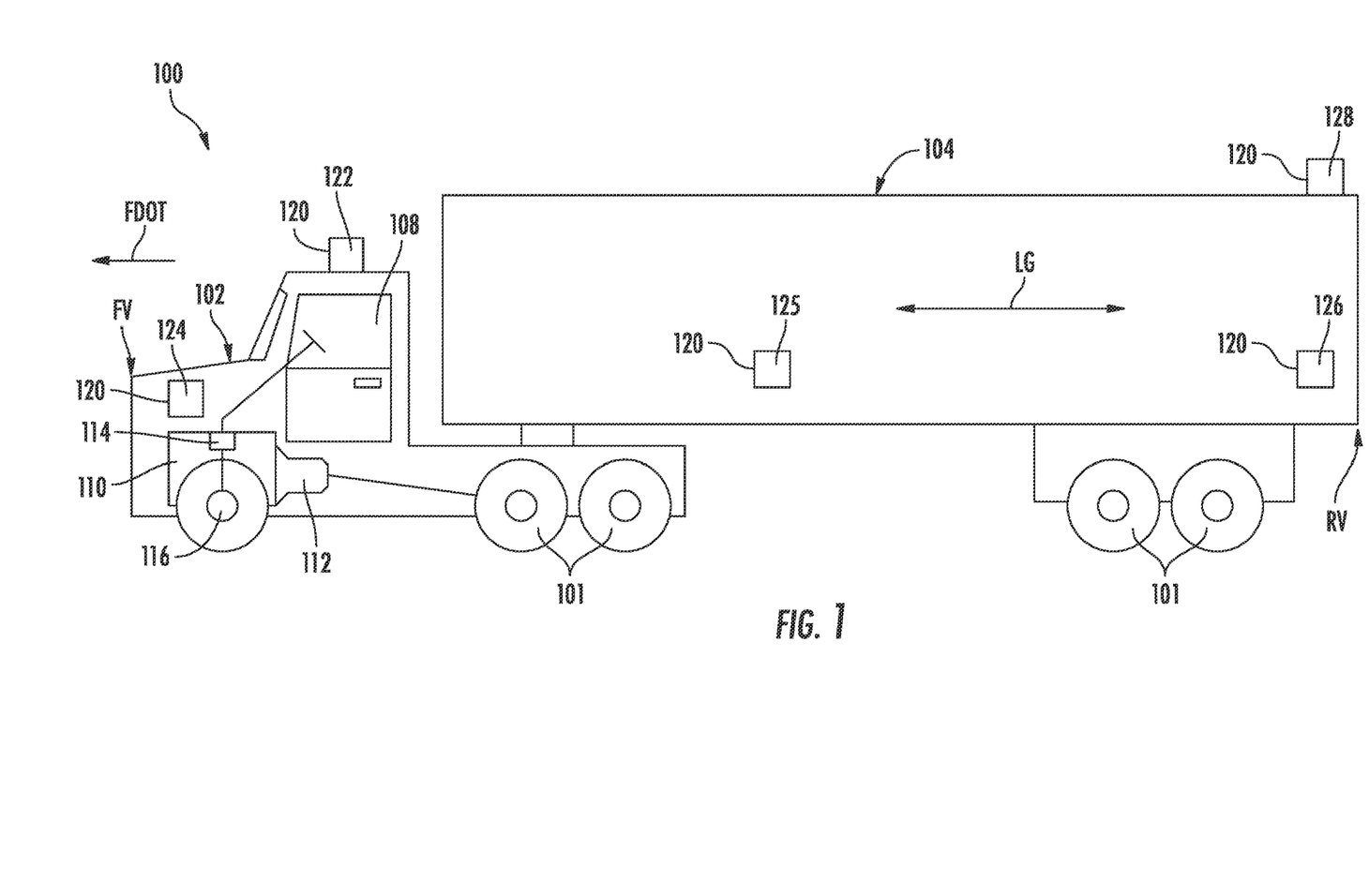
FIG. 1 is a side, elevation view of a commercial vehicle with a sensor system according to an example embodiment of the present subject matter.
Figure 2:
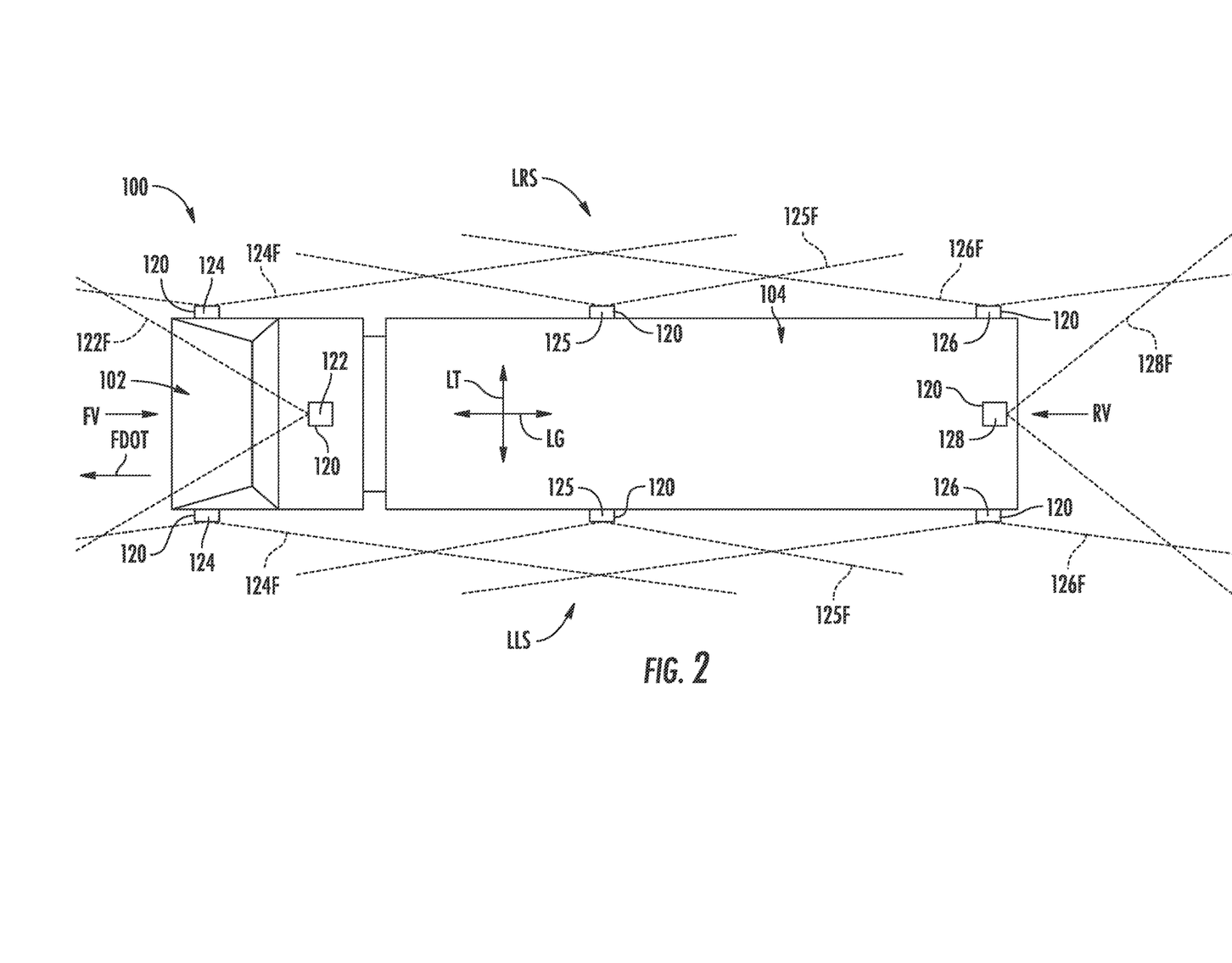
FIG. 2 is a top, plan view of the example commercial vehicle and the example sensor system of FIG. 1.

FIGS. 1 and 2 illustrate different views of a commercial vehicle 100 according to an example embodiment. For instance, FIG. 1 is a side, elevation view of commercial vehicle 100, and FIG. 2 is a top, plan view of commercial vehicle 100. As shown in FIGS. 1 and 2, commercial vehicle 100 includes a tractor 102 and a trailer 104 and is generally referred to as a "tractor-trailer truck." Commercial vehicle 100 is provided as an example only. For instance, commercial vehicle 100 may include one, two, or more additional trailers in alternative example embodiments. In addition, while described below in the context of commercial vehicle 100, it will be understood that the present subject matter may be used in or with any other suitable vehicle, including passenger vehicles, such as cars, vans, trucks, etc., or commercial vehicles, such as busses, box trucks, farm vehicles, construction vehicles, etc., in other example embodiments.

Commercial vehicle 100 may define a longitudinal direction LG and a lateral direction LT, which are perpendicular to each other. A front portion FV of commercial vehicle 100 and a rear portion RV of commercial vehicle 100 may be spaced apart from each other along the longitudinal direction LG. Thus, commercial vehicle 100 may extend between the front and rear portions FV, RV of commercial vehicle 100 along the longitudinal direction LG. Conversely, side portions of commercial vehicle 100 may be spaced apart from each other along the lateral direction LT. In particular, a left lateral side LLS of commercial vehicle 100 may be positioned opposite a right lateral side LRS of commercial vehicle 100 about the lateral direction LT. Thus, commercial vehicle 100 may extend between the left and right lateral sides LLS, LRS of commercial vehicle 100 along the lateral direction LT.

Tractor 102 is pivotally connected to trailer 104 via a hitch 106 and is operative to tow trailer 104. Various items for transport may be stored within trailer 104. In alternative example embodiments, trailer 104 may be open, e.g., a flat bed, depending on items stored on trailer 104. Tractor 102 may include various components for towing trailer 104, including a motor system 110, a transmission system 112, a steering system 114, a braking system 116, etc. A rider may sit within a cab 108 of tractor 104 during operation. However, commercial vehicle 100 need not include seating within cab 108 or any cab 108 at all in certain example embodiments, e.g., when commercial vehicle 100 is configured for fully automated driving.

In general, motor system 110, transmission system 112, steering system 114, and braking system 116 may be configured in any conventional manner. For example, motor system 110 may generally include a suitable prime mover, such as an electric motor or internal combustion engine, that is operative to propel commercial vehicle 100. Motor system 110 may be disposed within tractor 102 and may be connected to transmission system 112. Transmission system 112 is disposed within power flow between motor system 110 and wheels 101 of commercial vehicle 100. Transmission system 112 is operative to provide various speed and torque ratios between an input and output of the transmission system 112. Thus, e.g., transmission system 112 may provide a mechanical advantage to assist propulsion of commercial vehicle 100 by motor system 110. Steering system 114 is operable to adjust the direction of travel of commercial vehicle 100. For instance, steering system 114 may be coupled to the front wheels 101 of commercial vehicle 100 and be operatable to turn the front wheels 101 in response to a driver of commercial vehicle turning a steering wheel within cab 108 and/or operation of a prime mover within steering system 114. Braking system 116 is operable to decelerate commercial vehicle 100. For instance, braking system 116 may include friction brakes configured to selectively reduce the rotational velocity of wheels 101. Braking system 116 may also be configured to as a regenerative braking system that converts kinetic energy of wheels 101 into electric current. Operation of motor system 110, transmission system 112, steering system 114, and braking system 116 is well known to those skilled in the art and not described in extensive detail herein for the sake of brevity.

Commercial vehicle 100 also includes various components for fully autonomous and/or semi-autonomous operation. For instance, a plurality of sensors 120 may be positioned on tractor 102 and/or trailer 104. For example, the plurality of sensors 120 may include one or more front sensors 122, one or more front-side sensors 124, one or more mid-side sensors 125, one or more rear-side sensors 126, and/or one or more rear sensors 128. Front sensor(s) 122 may be positioned and oriented with a field of view directed forward of commercial vehicle 100 in order to detect an object(s) in front of commercial vehicle 100 relative to forward direction of travel FDOT, such as another vehicle travelling in front of commercial vehicle 100. For instance, as illustrated, front sensor 122 may be positioned on top of tractor 102 (e.g., on top of cab 108) or on top of trailer 104 (not shown), with a field of view 122F (FIG. 2) of the front sensor 122 directed forward of the commercial vehicle 100 relative to forward direction of travel FDOT. Similarly, side sensor(s) 124, 125, 126 may be positioned and oriented with a collective or overlapping field of view extending outwardly from the sides of commercial vehicle 100 in order to detect an object(s) at any position along the sides of commercial vehicle 100, such as another vehicle travelling at the side of commercial vehicle 100. For example, side sensor(s) 124, 125, 126 may be positioned at each side (e.g., left and right lateral sides LLS, LRS in FIG. 2) of commercial vehicle 100 such that a respective field of view 124F, 125F, 126F (FIG. 2) of the side sensor(s) 124, 125, 126 is directed outwardly from the relative side. For instance, as illustrated, front-side sensors 124 may be positioned on tractor 102 at each side (e.g., left and right lateral sides LLS, LRS) of commercial vehicle 100 proximate front portion FV of commercial vehicle 100 relative to forward direction of travel FDOT, mid-side sensors 125 may be positioned on trailer 104 at each side (e.g., left and right lateral sides LLS, LRS) of commercial vehicle 100 proximate a middle portion of commercial vehicle 100 relative to forward direction of travel FDOT, and rear-side sensors 126 may be positioned on trailer 104 at each side (e.g., left and right lateral sides LLS, LRS) of commercial vehicle 100 proximate rear portion RV of commercial vehicle 100 relative to forward direction of travel FDOT. Further, rear sensor(s) 128 may be positioned and oriented with a field of view 128F (FIG. 2) directed rearward of commercial vehicle 100 relative to forward direction of travel FDOT in order to detect an object(s) behind commercial vehicle 100, such as another vehicle travelling behind commercial vehicle 100. For example, as illustrated, rear sensor 128 may be positioned on top of trailer 104 (e.g., on a roof of trailer 104) proximate rear portion RV of commercial vehicle 100 relative to forward direction of travel FDOT, or on the rear side of trailer 104 (not shown) relative to forward direction of travel FDOT, with field of view 128F (FIG. 2) of rear sensor 128 being directed rearward of the commercial vehicle 100 relative to forward direction of travel FDOT. It will be understood that the positions of sensors 120 is provided by way of example only and alternative positions may be used to provide similar coverage. The respective field of view for each sensor 120 is generally indicated with the dashed lines extending from the sensor 120 in FIG. 2.

It should be appreciated that the sensors 120 may be configured as any suitable sensor for detecting object(s) adjacent or around commercial vehicle 100. For instance, each sensor 120 may include one or more of a LiDAR sensor unit, a radar sensor unit, a camera unit (e.g., optical or infrared), an acoustic sensor unit (e.g., microphone or sonar-type sensor), an inertial sensor unit (e.g., accelerometer or gyroscope), etc.

Figure 3:
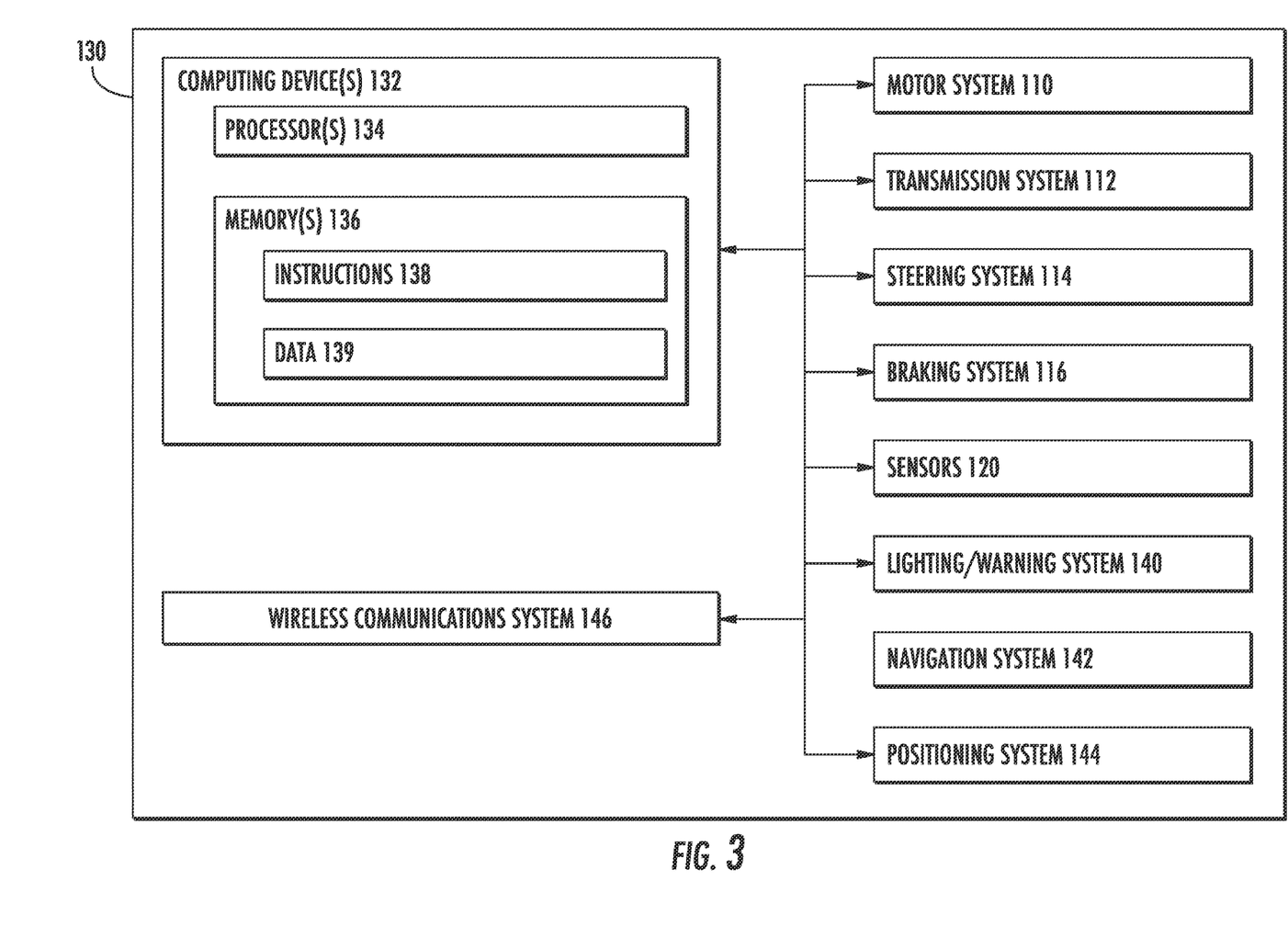
FIG. 3 is a schematic view of an example control system of the commercial vehicle of FIG. 1.

FIG. 3 is a schematic view of certain components of a control system 130 suitable for use with commercial vehicle 100. In general, control system 130 is configured to control operation of commercial vehicle 100 and components therein. Control system 130 may facilitate operation of commercial vehicle 100 in a fully autonomous and/or semi-autonomous mode of operation. For instance, control system 130 may be configured to operate commercial vehicle 100 in any of the levels defined by the U.S. National Highway Traffic Safety Administration and the Society of Automotive Engineers for defining the degree of control exercised by control system 130 to drive commercial vehicle 100. Level 0 has no automation, and the human driver makes all driving-related decisions; Level 1 is a semi-autonomous mode and includes some drive assistance, such as cruise control; Level 2 includes autonomous control of certain driving operations; Level 3 includes conditional automation that allows a human driver to selectively take control; Level 4 is a highly automated mode in which the commercial vehicle 100 is drivable without human assistance in certain conditions; and Level 5 is a fully autonomous mode in which the commercial vehicle 100 is drivable without human assistance in all situations. The present subject matter is operable to assist operation of commercial vehicle 100 in any of the semi-autonomous or fully autonomous modes described above, e.g., any of Levels 1-5, which is generally referred to herein as "autonomous" operation. Thus, as used herein, the term "autonomous" includes both semi-autonomous and fully autonomous operation, except when expressly indicated otherwise.

As shown in FIG. 3, control system 130 includes one or more computing devices 132 with one or more processors 134 and one or more memory devices 136 (hereinafter referred to as "memories 136"). In certain example embodiments, control system 130 may correspond to an electronic control unit (ECU) of tractor 102. The one or more memories 136 stores information accessible by the one or more processors 134, including instructions 138 that may be executed and data 139 usable by the one or more processors 134. The one or more memories 136 may be of any type capable of storing information accessible by the one or more processors 134, including a computing device-readable medium. The memory is a non-transitory medium, such as a hard-drive, memory card, optical disk, solid-state, tape memory, or the like. The one or more memories 136 may include different combinations of the foregoing, whereby different portions of the instructions and data are stored on different types of media. The one or more processor 134 may be any conventional processors, such as commercially available CPUs. Alternatively, the one or more processors 134 may be a dedicated device, such as an ASIC or other hardware-based processor.

Instructions 138 may be any set of instructions to be executed directly (such as machine code) or indirectly (such as scripts) by the one or more processors 134. For example, the instructions 138 may be stored as computing device code on the computing device-readable medium of the one or more memories 136. In that regard, the terms "instructions" and "programs" may be used interchangeably herein. Instructions 138 may be stored in object code format for direct processing by the processor or in any other computing device language, including scripts or collections of independent source code modules that are interpreted on demand or compiled in advance. Data 139 may be retrieved, stored, or modified by the one or more processors 134 in accordance with the instructions 138. For instance, data 139 of the one or more memories 136 may store information from sensors, including sensors 120. In FIG. 3, the processor(s) 134, memory(ies) 136, and other elements of computing devices 132 are shown within the same block. However, computing devices 132 may actually include multiple processors, computing devices, and/or memories that may or may not be stored within a common physical housing. Similarly, the one or more memories 136 may be a hard drive or other storage media located in a housing different from that of the processor(s) 134. Accordingly, computing devices 132 will be understood to include a collection of processor(s) and one or more memories that may or may not operate in parallel.

Control system 130, e.g., the computing device(s) 132, may form an autonomous driving system for commercial vehicle 100. The autonomous driving computing system may be configured for communicating with various components of commercial vehicle 100 in order to perform route planning and driving operations. For example, control system 130 may be in operative communication with various systems of the vehicle, including motor system 110, transmission system 112, steering system 114, and braking system 116. For instance, control system 130 may particularly be in operative communication with an engine control unit (ECU) 111 (not shown) of motor system 110 and a transmission control unit (TCU) 113 (not shown) of transmission system 112. Control unit 130 may also be in operative communication with other systems of commercial vehicle 100, including a lighting/warning system 140 (for controlling horns, headlights, taillights, and/or turn signals of commercial vehicle 100), a navigation system 142 (for navigating commercial vehicle 100 to a destination), and/or a positioning system 144 (for determining a current location (e.g., GPS coordinates) of commercial vehicle 100).

Control system 130, e.g., the computing device(s) 132, may be configured to control the direction and/or speed of commercial vehicle 100 by controlling the various components of commercial vehicle 100, such as motor system 110, transmission system 112, steering system 114, and braking system 116. For instance, control system 130 may navigate commercial vehicle 100 to a destination autonomously using data from navigation system 142 and/or positioning system 144. Computing devices 132 may use positioning system 144 to determine the current location of commercial vehicle 100 and sensors 120 to detect and navigate objects in order to reach the destination. During travel, computing devices 132 may selectively accelerate commercial vehicle (e.g., by throttling or energizing motor system 110), selectively decelerate commercial vehicle (e.g., by via motor system 110, changing gears within transmission system 112, and/or actuating braking system 116), and change the direction of travel for commercial vehicle 100 (e.g., by turning the front wheels 101 of commercial vehicle 100 with steering system 114).

Navigation system 142 may be used by control system 130 to determine and follow a route to a destination. Moreover, navigation system 142 and/or data 139 may store map information that computing devices 132 may utilize to navigate and/or control commercial vehicle 100. As an example, such maps within navigation system 142 and/or data 139 may include or be used to determine the shape and elevation of roadways, types of lane markers, intersection locations, crosswalks locations, speed limits, traffic light locations, building locations, sign types and locations, traffic information, etc. The lane markers may include features such as a single solid line, a single dashed line, double solid lines, double broken lines, a combination of a single solid line and single broken line, a curb, etc. Each lane is generally bounded by a left edge lane line and an opposite right edge lane line.

Sensors 120 may be used to detect external objects, such as other vehicles, obstacles in the roadway, lane markers, traffic signals, signs, trees, etc. Signals and data from sensors 120 may be received by control system 130 and/or stored within the one or more memories 136. For instance, sensors 120 may record data for processed by computing devices 132. Sensors 120 may detect objects and characteristics of the objects, such as location, orientation, size, shape, type, heading, velocity, acceleration, etc. The raw data from the sensors, such as LiDAR point clouds, and/or the aforementioned characteristics can be sent for further processing to the computing devices 132 periodically or continuously. Control system 130 may signals from sensors 120 to detect and navigate around objects while commercial vehicle 100 is operating autonomously.

Control system 130 may also include a wireless communication system 146 assists with wireless communication with other systems. For instance, wireless communication system 146 may wirelessly connect control system 130 with one or more other vehicles, buildings, etc. directly or via a communication network. Wireless communication system 146 may include an antenna and a chipset configured to communicate according to one or more wireless communication protocols, such as Bluetooth, communication protocols described in IEEE 802.11, GSM, CDMA, UMTS, EV-DO, WiMAX, LTE, Zigbee, dedicated short range communications (DSRC), radio frequency identification (RFID) communications, etc. It should be appreciated that the internal communication between the computing device(s) 132 and the system(s) 110, 112, 114, 116, 120, 140, 142, 144, 146 within commercial vehicle 100 may be wired and/or wireless.

Figure 4:
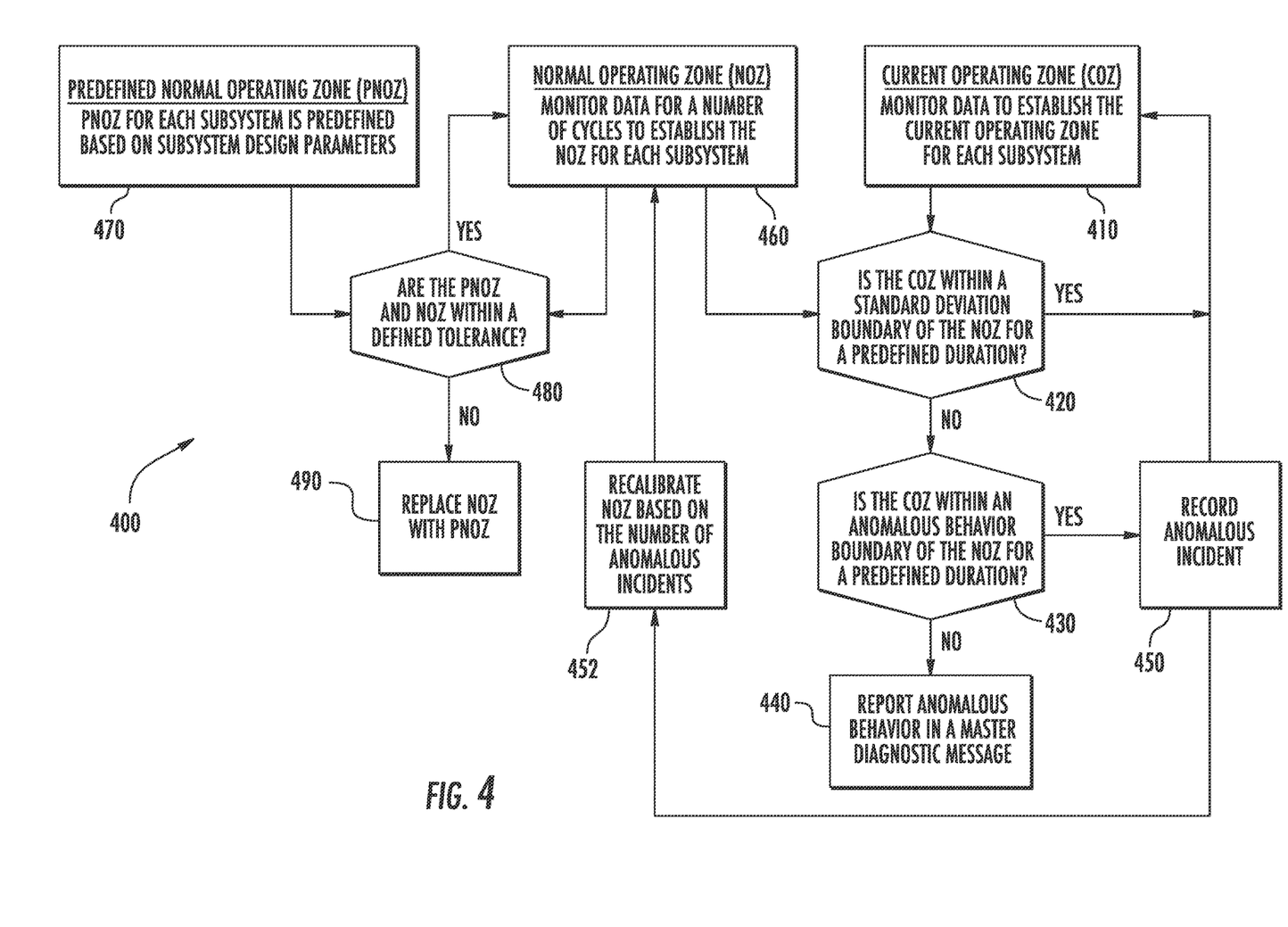
FIG. 4 is a diagram of a diagnostic method for an automated vehicle according to an example embodiment of the present subject matter.

FIG. 4 is a diagram of a diagnostic method 400 for an automated vehicle according to an example embodiment of the present subject matter. Method 400 may be used in or with any suitable vehicle. For example, method 400 may be used in or with autonomous passenger vehicles, such as cars, vans, trucks, etc., or autonomous commercial vehicles, such as busses, box trucks, farm vehicles, construction vehicles, etc. In certain example embodiments, method 400 may be used in or with commercial vehicle 100. In particular, control system 130 may be programmed to implement method 400. Thus, method 400 is described in greater detail below in the context of commercial vehicle 100. As discussed in greater detail below, method 400 may assist with detecting and/or remediating anomalies in subsystems of commercial vehicle 100, e.g., such as one or more of motor system 110, transmission system 112, steering system 114, and braking system 116.

Figure 6:
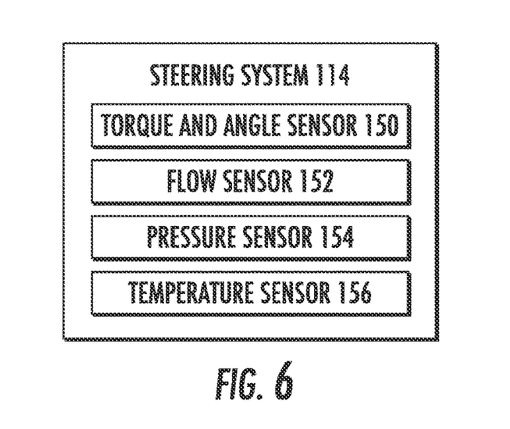
FIG. 6 is a schematic view of certain components of a steering system of the example commercial vehicle of FIG. 1.

At 410, method 400 may include monitoring data from subsystems of commercial vehicle 100, e.g., such as one or more of motor system 110, transmission system 112, steering system 114, and braking system 116, in order to establish a current operating zone COZ. The current operating zone COZ for each subsystem of commercial vehicle 100 may correspond to the respective current status of each subsystem of commercial vehicle 100, e.g., where each respective current status is determined based on monitored sensor data for such subsystem. For instance, control system 130 may receive data from sensors within subsystems of commercial vehicle 100 at 410. As a particular example, control system 130 may monitor sensor signal(s) from steering system 114 at 410, e.g., sensor signal(s) from one or more of a torque and angle sensor 150, a flow sensor 152, a pressure sensor 154, and a temperature sensor 156 of steering system 114 shown in FIG. 6. Based on the sensor data from steering system 114, the current status or current operating zone COZ for steering system 114 may be established. Similar sensor signal(s) from similar sensor(s) of motor system 110, transmission system 112, braking system 116, etc. may also be monitored at 410 to determine the current operating zone COZ for such respective subsystems of commercial vehicle 100 in the same or similar manner.

Similarly, at 460, method 400 may include monitoring data from subsystems of commercial vehicle 100, e.g., such as one or more of motor system 110, transmission system 112, steering system 114, and braking system 116, for a number of operating cycles in order to establish the normal operating zone NOZ for the subsystems. The normal operating zone NOZ for each subsystem of commercial vehicle 100 may correspond to the respective expected or desired status of each subsystem of commercial vehicle 100. Using data from sensors over multiple operating cycles allows for determining the normal operating zones NOZ for the subsystems. For instance, the average values of the sensor signal(s) may be established at 460. For example, control system 130 may receive data from sensors within subsystems of commercial vehicle 100 at 460 over numerous (e.g., no less than five, no less than ten, no less than twenty, no less than thirty, etc.) operating cycles or trips of commercial vehicle 100. As a particular example, control system 130 may monitor and analyze (e.g., take an average of) sensor signal(s) from sensors of steering system 114, e.g., from one or more of the torque and angle sensor 150, the flow sensor 152, the pressure sensor 154, and the temperature sensor 156 of steering system 114, over about ten operating cycles of commercial vehicle 100 at 460 to determine the normal operating zone NOZ for steering system 114. Similar sensor signal(s) from motor system 110, transmission system 112, braking system 116, etc. may also be monitored at 460 to determine normal operating zones NOZ for the respective systems.

Once the current operating zone COZ and normal operating zone NOZ are established, at 420 and 430, method 400 may include comparing the current operating zone COZ for each subsystem of commercial vehicle 100 to a respective boundary of the normal operating zone NOZ for each of the subsystems. As indicated above, the normal operating zone NOZ for each subsystem of commercial vehicle 100 may correspond to the respective expected or desired status of each subsystem of commercial vehicle 100, and the current operating zone COZ may correspond to the respective current status of each subsystem of commercial vehicle 100. By comparing the current operating zone COZ for each subsystem of commercial vehicle 100 to the respective normal operating zone NOZ for each of the subsystems, method 400 may detect anomalies in subsystems of commercial vehicle 100.

At 420, method 400 may include determining whether the current operating zone COZ for each subsystem of commercial vehicle 100 is within a standard deviation boundary of the respective normal operating zone NOZ for each of the subsystems, e.g., for a predetermined period of time. The standard deviation boundary of the normal operating zones NOZ may correspond to an allowable or permissible difference between the current operating zone COZ for each subsystem of commercial vehicle 100 and the respective normal operating zone NOZ for each of the subsystems. Thus, when the current operating zone COZ for each subsystem of commercial vehicle 100 is within the standard deviation boundary of the respective normal operating zone NOZ for each of the subsystems, method 400 may determine that the subsystems are operating normally and loop back to 410. Conversely, method 400 may determine that the subsystems are operating outside of the allowable or permissible range when the current operating zone COZ for each subsystem of commercial vehicle 100 is not within the standard deviation boundary of the respective normal operating zone NOZ for each of the subsystems. As an example, control system 130 may determine that steering system 114 is operating normally when the current operating zone COZ for steering system 114 determined from 410 is within the standard deviation boundary of the normal operating zone NOZ for steering system 114 determined from 460. Conversely, control system 130 may determine that steering system 114 is operating outside of the allowable or permissible range when the current operating zone COZ for steering system 114 from 410 is not within or is outside of the standard deviation boundary of the normal operating zone NOZ for steering system 114 determined from 460. It should be appreciated that the predetermined period of time at 420 may be selected to avoid false positives, e.g., to avoid or limit transient values of the current operating zone COZ from triggering an indication that the subsystem(s) is/are operating outside of the allowable or permissible range. Thus, e.g., the predetermined period of time may be a half second (0.5 s), one second (1 s), two seconds (2 s), etc.

At 430, method 400 may include determining whether the current operating zone COZ for each subsystem of commercial vehicle 100 is within an anomalous behavior boundary of the respective normal operating zone NOZ for each of the subsystems, e.g., for a predetermined period of time. The anomalous behavior boundary of the normal operating zones NOZ may correspond to a threshold for identifying anomalous behavior for each subsystem of commercial vehicle 100. Thus, when the current operating zone COZ for each subsystem of commercial vehicle 100 is within the anomalous behavior boundary of the respective normal operating zone NOZ for each of the subsystems, method 400 may determine that the subsystems are operating within functional parameters, record an anomalous incident at 450 (discussed in greater detail below), and loop back to 410. Conversely, method 400 may determine that the subsystems are operating anomalously when the current operating zone COZ for each subsystem of commercial vehicle 100 is not within or is outside of the anomalous behavior boundary of the respective normal operating zone NOZ for each of the subsystems. As an example, control system 130 may determine at 430 that steering system 114 is operating within functional parameters when the current operating zone COZ for steering system 114 determined from 410 is within the anomalous behavior boundary of the normal operating zone NOZ for steering system 114 determined from 460. Conversely, control system 130 may determine at 430 that steering system 114 is operating anomalously when the current operating zone COZ for steering system 114 determined from 410 is not within or is outside of the anomalous behavior boundary of the normal operating zone NOZ for steering system 114 determined from 460. It should be appreciated that the predetermined period of time at 430 may be selected to avoid false positives, e.g., to avoid or limit transient values of the current operating zone COZ from triggering an indication that the subsystem(s) is/are operating anomalously. Thus, e.g., the predetermined period of time may be a half second (0.5 s), one second (1 s), two seconds (2 s), etc.

The difference between 420 and 430 may lie in the degrees of difference between the current operating zone COZ and the normal operating zone NOZ. For instance, each standard deviation boundary of the normal operating zones NOZ for the subsystems may be selected to assist with detecting normal operation of the subsystems of commercial vehicle 100. When the current operating zone COZ for a subsystem of commercial vehicle 100 is within the standard deviation boundary of the respective normal operating zone NOZ for the subsystem, method 400 may operate as if the subsystem is operating normally. Conversely, method 400 proceeds to 430 when the current operating zone COZ for the subsystem of commercial vehicle 100 is not within the standard deviation boundary of the respective normal operating zone NOZ for the subsystem. Moreover, each anomalous behavior boundary of the normal operating zones NOZ for the subsystems may be selected to assist with detecting anomalous operation of the subsystems of commercial vehicle 100. When the current operating zone COZ for a subsystem of commercial vehicle 100 is not within or is outside of the anomalous behavior boundary of the respective normal operating zone NOZ for the subsystem, method 400 may operate as if the subsystem is operating anomalously. Conversely, when the current operating zone COZ for the subsystem of commercial vehicle 100 is within the anomalous behavior boundary of the respective normal operating zone NOZ for the subsystem, method 400 may operate as if the subsystem is operating normally but may update the normal operating zone NOZ, e.g., to account for the difference between the current operating zone COZ for the subsystem and the respective normal operating zone NOZ for the subsystem.

For instance, when the current operating zone COZ for the subsystem of commercial vehicle 100 is within the anomalous behavior boundary of the respective normal operating zone NOZ for the subsystem, method 400 may record anomalous incident at 450 and loop back to 410. Recording anomalous incident(s) at 450 may assist with detecting inaccurate normal operating zones NOZ. For instance, the normal operating zone NOZ may require adjustment over time, e.g., to account for wear within the subsystems. When the recorded number of anomalous incidents at 450 exceeds a threshold number, the normal operating zone NOZ may be recalibrated at 452. Thus, e.g., when the current operating zone COZ for a subsystem of commercial vehicle 100 is frequently outside of the standard deviation boundary of the respective normal operating zone NOZ for the subsystem, but also within the anomalous behavior boundary of the normal operating zones NOZ for the subsystem, method 400 may recalibrate or adjust the normal operating zones NOZ at 452.

Conversely, when the current operating zone COZ for a subsystem of commercial vehicle 100 is not within or is outside of the anomalous behavior boundary of the respective normal operating zone NOZ for the subsystem at 430, e.g., for the predetermined period of time, method 400 may include at 440 reporting anomalous behavior of subsystems of commercial vehicle 100 via a master diagnostic message. The master diagnostic message may be populated with the status for each subsystem of commercial vehicle 100, e.g., a normal status or an anomalous status. Thus, the current diagnostic status of each subsystem may be consolidated within the master diagnostic message, and the master diagnostic message may be transmitted to and/or monitored by each subsystem of commercial vehicle 100. When one or more of the subsystems is operating anomalously, the master diagnostic message may alert the other subsystems of such anomalous state. In response to the anomalous status of one or more of the subsystems within the master diagnostic message, operation of one or more of the other subsystems of commercial vehicle 100 may adjust operations to ensure safe operation of commercial vehicle 100 despite the anomalous status of the one or more of the subsystems. For instance, operation of the other subsystems of commercial vehicle 100 may be adjusted to bring commercial vehicle 100 to a safe state. The master diagnostic message may be a series of escalating messages, including requesting service at the next regularly scheduled opportunity, requesting service at the end of the current trip, transferring commercial vehicle 100 into a limp mode and returning the vehicle home, immediately pulling to the shoulder of a road and stopping commercial vehicle 100, etc.

Further, method 400 may include, at 470, predefining and saving a predefined normal operating zone PNOZ for each subsystem within control system 130. The predefined normal operating zone PNOZ for each subsystem may be based on respective design parameters for each subsystem. Thus, e.g., the predefined normal operating zone PNOZ may correspond to a modeled expected value for the normal operating zone NOZ rather than an empirically derived normal operating zone NOZ, such as from 460. The predefined normal operating zone PNOZ from 470 may be used until establishment of the normal operating zones NOZ for the subsystems at 460. In addition, at 480, control system 130 may compare the normal operating zone NOZ for each subsystem from 460 to the respective predefined normal operating zone PNOZ for such subsystem from 470. When the normal operating zone NOZ for each subsystem from 460 is different from the respective predefined normal operating zone PNOZ from 470 by more than a defined tolerance, control system 130 may replace the normal operating zone NOZ from 460 with the predefined normal operating zone PNOZ from 470, e.g., for use at 420 and 430.

Utilizing method 400, control system 130 may assist with detecting and/or commercial vehicle and/or remediate vehicle subsystem anomalies in automated vehicles, e.g., in lieu of a conventional driver.

Figure 5:
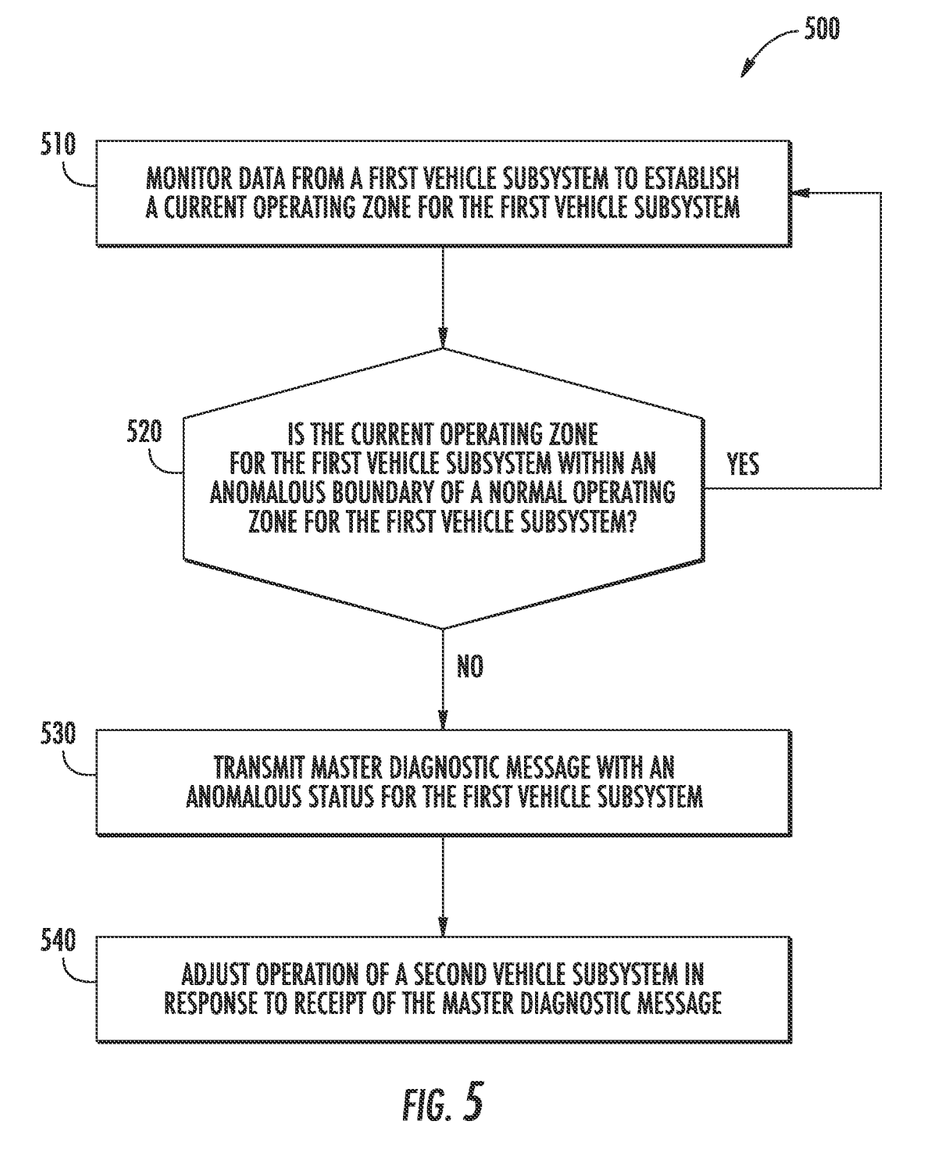
FIG. 5 is a diagram of a diagnostic method for an automated vehicle according to another example embodiment of the present subject matter.

FIG. 5 is a diagram of a diagnostic method 500 for an automated vehicle according to another example embodiment of the present subject matter. Method 500 may be used in or with any suitable vehicle. For example, method 500 may be used in or with autonomous passenger vehicles, such as cars, vans, trucks, etc., or autonomous commercial vehicles, such as busses, box trucks, farm vehicles, construction vehicles, etc. In certain example embodiments, method 500 may be used in or with commercial vehicle 100. In particular, control system 130 may be programmed to implement method 500. Thus, method 500 is described in greater detail below in the context of commercial vehicle 100. As discussed in greater detail below, method 500 may assist with detecting and/or remediating anomalies in subsystems of commercial vehicle 100, e.g., such as one or more of motor system 110, transmission system 112, steering system 114, and braking system 116. Method 500 is similar to method 400, and various portions of the methods 400, 500 may be used in combination in certain example embodiments.

At 510, data from a first vehicle subsystem of a plurality of vehicle subsystems is monitored to establish the current operating zone COZ for the first vehicle subsystem. As an example, at 510, data from one or more of motor system 110, transmission system 112, steering system 114, and braking system 116 may be monitored in order to establish the current operating zone COZ. For instance, control system 130 may receive data from sensors within subsystems of commercial vehicle 100 at 510. As a particular example, control system 130 may monitor sensor signal(s) from steering system 114, e.g., from one or more of the torque and angle sensor 150, the flow sensor 152, the pressure sensor 154, and the temperature sensor 156 of steering system 114, at 510. Similar sensor signal(s) from motor system 110, transmission system 112, braking system 116, etc. may also be monitored at 510 to establish the current operating zone COZ for the each of the other vehicle subsystems.

At 520, it is determined whether the current operating zone COZ for the first vehicle subsystem of commercial vehicle 100 is within the anomalous behavior boundary of the normal operating zone NOZ for the first vehicle subsystem. When the current operating zone COZ for the first vehicle subsystem is within the anomalous behavior boundary of the normal operating zone NOZ for the first vehicle subsystem, method 500 may determine that the first vehicle subsystem is operating normally and loop back to 510. Conversely, when the current operating zone COZ for the first vehicle subsystem is outside of the anomalous behavior boundary of the normal operating zone NOZ for the first vehicle subsystem, method 500 may determine that the first vehicle subsystem is operating anomalously and proceed to 530.

At 530, a master diagnostic message is transmitted with an anomalous status for the first vehicle subsystem. The common master diagnostic message may be transmitted to each vehicle subsystem of the plurality of vehicle subsystems at 530. Thus, method 500 may advantageously communicate the anomalous status for the first vehicle subsystem to other subsystems within commercial vehicle using the master diagnostic message.

Figure 7:
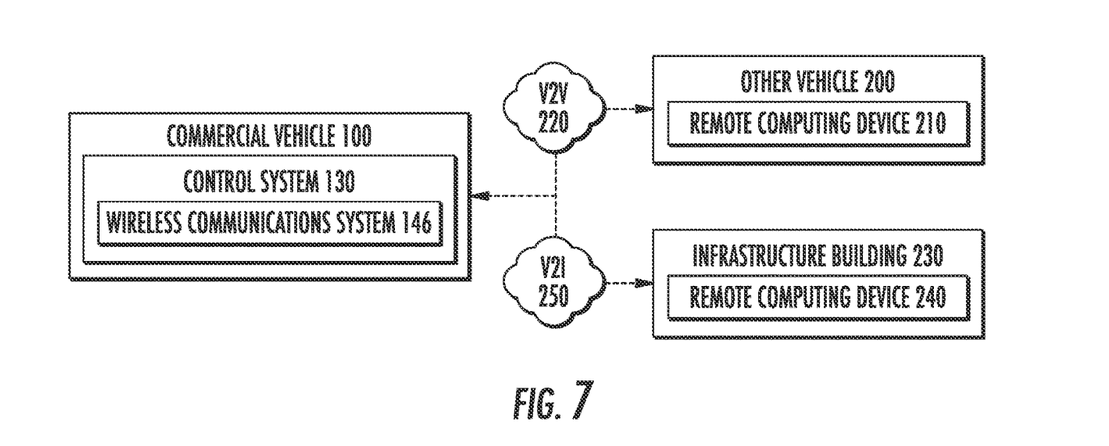
FIG. 7 is a schematic view of communications networks between the control system of the example commercial vehicle of FIG. 1 and remote computing devices.

At 530, method 500 may also include transmitting the master diagnostic message with the anomalous status for the first vehicle subsystem to a remote computing device. For example, with reference to FIG. 7, a remote computing device 210 may be disposed within another vehicle 200, and the remote computing device 210 may receive the master diagnostic message with the anomalous status for the first vehicle subsystem over a vehicle-to-vehicle network 220. Thus, e.g., law enforcement vehicles and/or vehicles proximate commercial vehicle 100 may communicate with commercial vehicle 100 over vehicle-to-vehicle network 220 and be alerted to the anomalous status for the first vehicle subsystem. As another example, a remote computing device 240 may be disposed within an infrastructure building 230, and the remote computing device 240 may receive the master diagnostic message with the anomalous status for the first vehicle subsystem over a vehicle-to-infrastructure network 250. Thus, e.g., vehicle inspectors and/or remote health monitoring services may communicate with commercial vehicle 100 over vehicle-to-infrastructure network 250 and be alerted to the anomalous status for the first vehicle subsystem.

Referring back to FIG. 5, at 540, operation of at least a second one of the plurality of vehicle subsystems (e.g., other than the first vehicle subsystem) may be adjusted in response to receiving the master diagnostic message with the anomalous status for the first vehicle subsystem from 530. Thus, e.g., control system 130 and/or the other subsystems may modify operation of commercial vehicle 100 when method 500 detects the first vehicle subsystem is operating anomalously. For example, adjusting operation of at least the second one of the plurality of vehicle subsystems at 540 may result in a reduced speed of commercial vehicle 100, a lane change, pulling onto a shoulder, etc. Method 500 may also include scheduling service of the first vehicle subsystem in response to receiving the master diagnostic message with the anomalous status for the first vehicle subsystem.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

100 Commercial vehicle
101 Wheels
102 Tractor
104 Trailer
110 Motor system
112 Transmission system
114 Steering system
116 Braking system
120 Sensors
122 Front sensor
122F Field of view
124 Front-side sensors
124F Field of view
125 Mid-side sensors
125F Field of view
126 Rear-side sensors
126F Field of view
128 Rear sensor
128F Field of view
130 Control system
132 Computing devices
134 Processors
136 Memories
138 Instructions
139 Data
140 Lighting/warning system
142 Navigation system
144 Positioning system
146 Wireless communications system
150 Torque and angle sensor
152 Flow sensor
154 Pressure sensor
156 Temperature sensor
200 Another vehicle
210 Remote computing device
220 Vehicle-to-vehicle network
230 Infrastructure building
240 Remote computing device
250 Vehicle-to-infrastructure network
400 Method
500 Method
FDOT Forward direction of travel
LG Longitudinal direction
FV Front portion
RV Rear portion
LT Lateral direction
LLS Lateral left side
LRS Lateral right side

What is claimed is:

1. A diagnostic method for an automated vehicle, comprising:
    monitoring data from a first vehicle subsystem of a plurality of vehicle subsystems to establish a current operating zone for the first vehicle subsystem;
    determining a normal operating zone for the first vehicle subsystem based on the data from the first vehicle subsystem over a plurality of operating cycles;
    transmitting a master diagnostic message with an anomalous status for the first vehicle subsystem in response to the current operating zone for the first vehicle subsystem being outside of an anomalous behavior boundary of the normal operating zone for the first vehicle subsystem for at least a predetermined period of time, the master diagnostic message being transmitted to each vehicle subsystem of the plurality of vehicle subsystems; and
    adjusting operation of at least a second one of the plurality of vehicle subsystems in response to the at least the second one of the plurality of vehicle subsystems receiving the master diagnostic message with the anomalous status for the first vehicle subsystem.

2. The diagnostic method of claim 1, further comprising:
    when the current operating zone for the first vehicle subsystem is within the anomalous behavior boundary of the normal operating zone for the first vehicle subsystem, recording an operating zone deviation incident each time that the current operating zone for the first vehicle subsystem is outside of the normal operating zone for the first vehicle subsystem for at least the predetermined period of time; and
    in response to a total number of recorded operating zone deviation incidents exceeding a threshold number of incidents, adjusting the normal operating zone for the first vehicle subsystem.

3. The diagnostic method of claim 2, wherein the normal operating zone for the first vehicle subsystem is adjusted to account for wear of the first vehicle subsystem.

4. The diagnostic method of claim 1, further comprising replacing the determined normal operating zone for the first vehicle subsystem with a predefined theoretical normal operating zone based on design parameters for the first vehicle subsystem when the determined normal operating zone is different from the predefined theoretical normal operating zone by more than a threshold tolerance.

5. The diagnostic method of claim 1, wherein the plurality of vehicle subsystems comprises two or more of a steering system, a braking system, and a powertrain system.

6. The diagnostic method of claim 5, wherein the first vehicle subsystem comprises the steering system, and monitoring data from the first vehicle subsystem comprises monitoring a signal from a torque and angle sensor of the steering system.

7. The diagnostic method of claim 6, wherein monitoring data from the first vehicle subsystem further comprises monitoring a signal from one or more of a flow sensor, a pressure sensor, and a temperature sensor of the steering system.

8. The diagnostic method of claim 1, further comprising transmitting the master diagnostic message with the anomalous status for the first vehicle subsystem to a remote computing device.

9. The diagnostic method of claim 8, wherein the remote computing device is disposed within another vehicle, and the remote computing device receives the master diagnostic message with the anomalous status for the first vehicle subsystem over a vehicle-to-vehicle network.

10. The diagnostic method of claim 8, wherein the remote computing device is disposed within an infrastructure building, and the remote computing device receives the master diagnostic message with the anomalous status for the first vehicle subsystem over a vehicle-to-infrastructure network.

11. The diagnostic method of claim 1, wherein adjusting operation of at least the second one of the plurality of vehicle subsystems reduces a vehicle speed.

12. The diagnostic method of claim 1, further comprising scheduling service of the first vehicle subsystem in response to receiving the master diagnostic message with the anomalous status for the first vehicle subsystem.

13. A diagnostic system for an automated vehicle, comprising:
one or more processing devices; and
one or more non-transitory, computer-readable memories storing instructions that when executed by the one or more processing devices cause the one or more processing devices to
monitor data from a first vehicle subsystem of a plurality of vehicle subsystems to establish a current operating zone for the first vehicle subsystem,
determine a normal operating zone for the first vehicle subsystem based on the data from the first vehicle subsystem over a plurality of operating cycles,
in response to the current operating zone for the first vehicle subsystem being outside of an anomalous behavior boundary of the normal operating zone for the first vehicle subsystem for at least a predetermined period of time, generate a master diagnostic message with an anomalous status for the first vehicle subsystem for transmission to each vehicle subsystem of the plurality of vehicle subsystems, and
order adjustment in operation of at least a second one of the plurality of vehicle subsystems in response to the master diagnostic message with the anomalous status for the first vehicle subsystem being received by the at least the second one of the plurality of vehicle subsystems.

14. The diagnostic system of claim 13, wherein the instructions, when executed by the one or more processing devices, further cause the one or more processing devices to:
when the current operating zone for the first vehicle subsystem is within the anomalous behavior boundary of the normal operating zone for the first vehicle subsystem, record an operating zone deviation incident each time that the current operating zone for the first vehicle subsystem outside of the normal operating zone for the first vehicle subsystem for at least the predetermined period of time; and
in response to a total number of recorded operating zone deviation incidents exceeding a threshold number of incidents, adjust the normal operating zone for the first vehicle subsystem.

15. The diagnostic system of claim 13, wherein the instructions, when executed by the one or more processing devices, further cause the one or more processing devices to replace the determined normal operating zone for the first vehicle subsystem with a predefined theoretical normal operating zone based on subsystem design parameters when the determined normal operating zone is different from the predefined theoretical normal operating zone by more than a threshold tolerance.

16. The diagnostic system of claim 13, wherein the plurality of vehicle subsystems comprises two or more of a steering system, a braking system, and a powertrain system.

17. The diagnostic system of claim 16, wherein the first vehicle subsystem is the steering system, and the data from the first vehicle subsystem is from one or more of a torque and angle sensor, a flow sensor, a pressure sensor, and a temperature sensor of the steering system.

18. A diagnostic method for an automated vehicle, comprising:
monitoring a signal from a torque and angle sensor of a first vehicle subsystem of a plurality of vehicle subsystems to establish a current operating zone for the first vehicle subsystem, the first vehicle subsystem comprising a steering system, the plurality of vehicle subsystems further comprising at least one of a braking system or a powertrain system;
transmitting a master diagnostic message with an anomalous status for the first vehicle subsystem in response to the current operating zone for the first vehicle subsystem being outside of an anomalous behavior boundary of a normal operating zone for the first vehicle subsystem for at least a predetermined period of time, the master diagnostic message being transmitted to each vehicle subsystem of the plurality of vehicle subsystems; and
adjusting operation of at least a second one of the plurality of vehicle subsystems in response to the at least the second one of the plurality of vehicle subsystems receiving the master diagnostic message with the anomalous status for the first vehicle subsystem.

19. The diagnostic method of claim 18, further comprising:
when the current operating zone for the first vehicle subsystem is within the anomalous behavior boundary of the normal operating zone for the first vehicle subsystem, recording an operating zone deviation incident each time that the current operating zone for the first vehicle subsystem is outside of the normal operating zone for the first vehicle subsystem for at least the predetermined period of time; and
in response to a total number of recorded operating zone deviation incidents exceeding a threshold number of incidents, adjusting the normal operating zone for the first vehicle subsystem.

20. The diagnostic method of claim 18, further comprising determining the normal operating zone for the first vehicle subsystem based on the signal from the first vehicle subsystem over a plurality of operating cycles.

* * * * *